US011456961B1

(12) United States Patent
Mui et al.

(10) Patent No.: US 11,456,961 B1
(45) Date of Patent: Sep. 27, 2022

(54) METHOD TO ACCELERATE PACKET DETECTION RULE (PDR) MATCHING AND DATA PACKET PROCESSING IN A USER PLANE FUNCTION (UPF) MODULE IN A COMMUNICATIONS NETWORK

(71) Applicant: Hong Kong Applied Science And Technology Research Institute Co., Ltd., Shatin (HK)

(72) Inventors: Ka Ho Mui, Kowloon (HK); Wei Chen, Tai Wai (HK); Jianjun Zhang, Shatin (HK); Liang Xia, Shatin (HK); Jingwei Liu, Shatin (HK); Liang Dong, Tseung Kwan O (HK)

(73) Assignee: Hong Kong Applied Science And Technology Research Institute Co., Ltd, New Territories (HK)

( * ) Notice: Subject to any disclaimer, the term of this patent is extended or adjusted under 35 U.S.C. 154(b) by 0 days.

(21) Appl. No.: 17/228,067

(22) Filed: Apr. 12, 2021

(51) Int. Cl.
*H04L 47/2483* (2022.01)
*H04L 47/2441* (2022.01)
*H04L 47/2416* (2022.01)
*H04W 8/04* (2009.01)

(52) U.S. Cl.
CPC ...... *H04L 47/2483* (2013.01); *H04L 47/2416* (2013.01); *H04L 47/2441* (2013.01); *H04W 8/04* (2013.01)

(58) Field of Classification Search
CPC . H04L 47/2483; H04L 47/2416; H04L 47/24; H04L 47/2441; H04L 41/0894; H04L 45/38
See application file for complete search history.

(56) References Cited

U.S. PATENT DOCUMENTS

| 8,817,792 | B2* | 8/2014 | Yu | H04L 45/38 370/473 |
|---|---|---|---|---|
| 9,967,178 | B1* | 5/2018 | K S | H04L 45/38 |
| 10,454,790 | B2 | 10/2019 | Goldfarb et al. | |
| 10,476,747 | B1* | 11/2019 | Tönsing | H04L 45/08 |

(Continued)

FOREIGN PATENT DOCUMENTS

| CN | 109451534 A | 3/2019 |
| WO | 2020224556 A1 | 11/2020 |

OTHER PUBLICATIONS

Ericsson, "DL Data Notification for the subsequent DL data pertaining to a different QoS flow 3GPP TSG-CT WG4 meeting #98e C4-203218", Jun. 12, 2020.

(Continued)

*Primary Examiner* — Mohamed A Kamara
(74) *Attorney, Agent, or Firm* — GableGotwals

(57) ABSTRACT

Described is a method of processing data packets in a communications network. The method comprises receiving a first data packet of a data packet flow from a network device and determining an instruction set for processing said first data packet. A flow key for said first data packet is determined. The first data packet is processed according to the determined instruction set. The method includes receiving a subsequent data packet and determining if a flow key of said subsequent data packet matches said flow key of said first data packet. If yes, the subsequent data packet is processed using the instruction set determined for said first data packet.

19 Claims, 14 Drawing Sheets

(56) References Cited

U.S. PATENT DOCUMENTS

| | | | |
|---|---|---|---|
| 2015/0180769 A1* | 6/2015 | Wang | H04L 45/38 |
| | | | 370/236 |
| 2016/0094460 A1* | 3/2016 | Shelar | H04L 45/56 |
| | | | 370/392 |
| 2020/0145876 A1 | 5/2020 | Dao et al. | |
| 2020/0267077 A1 | 8/2020 | Williams et al. | |
| 2020/0275305 A1* | 8/2020 | Huang-Fu | H04W 80/10 |
| 2022/0167203 A1* | 5/2022 | Ding | H04L 12/14 |

OTHER PUBLICATIONS

Huawei et al, "Support of forwarding of broadcast and multicast packets 3GPP TSG-SA2 Meeting #134 S2-1908593 28", Jun. 28, 2019, pp. 2-7.

* cited by examiner

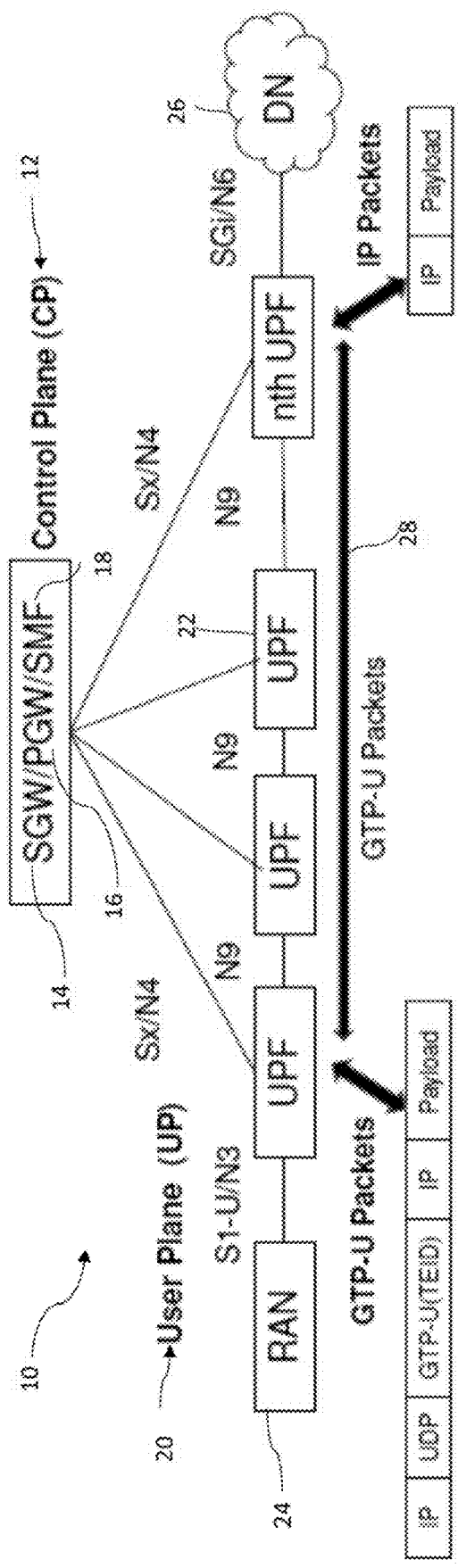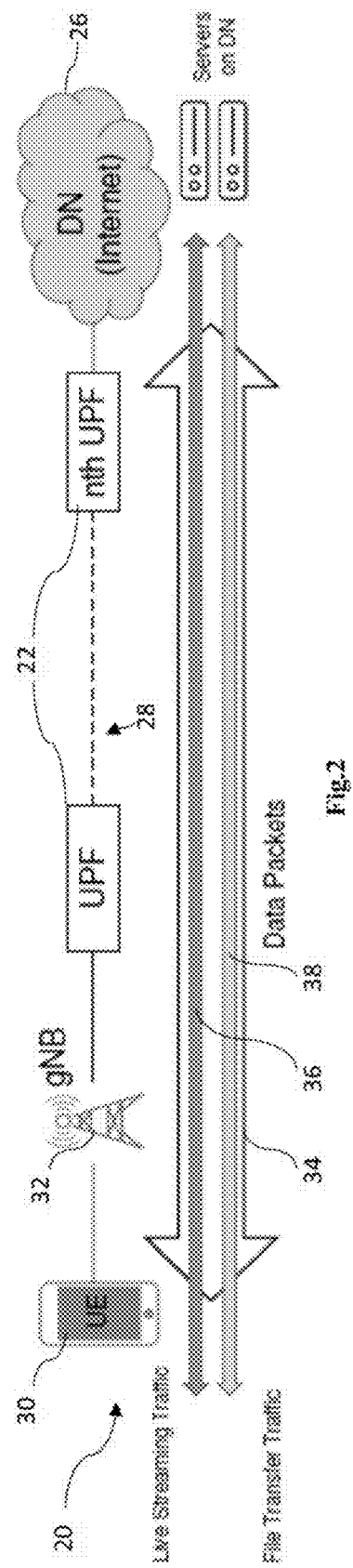

METHOD TO ACCELERATE PACKET DETECTION RULE (PDR) MATCHING AND DATA PACKET PROCESSING IN A USER PLANE FUNCTION (UPF) MODULE IN A COMMUNICATIONS NETWORK

FIELD OF THE INVENTION

The invention relates particularly, but not exclusively, to a method for accelerating Packet Detection Rule (PDR) searching/matching and packet processing in a User Plane Function (UPF) module in a communications network.

BACKGROUND OF THE INVENTION

The UPF is a fundamental component of a 3GPP 5G communications network core infrastructure system architecture. The UPF represents the data plane (DP) evolution of a Control and User Plane Separation (CUPS) system architecture, first introduced as an extension to existing Evolved Packet Cores (EPCs) by the 3GPP in their Release 14 specifications. CUPS decouples Packet Gateway (PGW) control and user plane (UP) functions, enabling the data forwarding component (PGW-U) to be decentralized. This allows packet processing and traffic aggregation to be performed closer to the network edge, increasing bandwidth efficiencies while reducing network latencies. The PGW handling signaling traffic (PGW-C) remains in the network core.

In a typical 5G wireless communications network, there can be over 100,000 or more user equipment (UEs) located on a single User Plane Function (UPF) to transfer data packets simultaneously. The total amount of traffic being processed through the UPF could be significant and at the Gb scale. Therefore, data packet processing performance such as throughput & latency for UPF processing is of considerable importance on the 5G DP path.

Among other things, what is therefore desired is a method for reducing the latency of packet processing on the UPF and/or increasing UPF packet processing throughput.

OBJECTS OF THE INVENTION

An object of the invention is to mitigate or obviate to some degree one or more problems associated with known methods of packet processing on UPF.

The above object is met by the combination of features of the main claims; the sub-claims disclose further advantageous embodiments of the invention.

Another object of the invention is to provide a novel UPF module.

A further object of the invention is to provide an improved method for reducing the latency of packet processing on UPF and/or increasing UPF packet processing throughput.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of processing data packets in a communications network. The method comprises receiving a first data packet of a data packet flow from a network device and determining an instruction set for processing said first data packet. A flow key for said first data packet is determined. The first data packet is processed according to the determined instruction set. The method includes receiving a subsequent data packet and determining if a flow key of said subsequent data packet matches said flow key of said first data packet. If yes, the subsequent data packet is processed using the instruction set determined for said first data packet.

In a second main aspect, the invention provides a module in a communication network for processing data packets, said module comprising a memory storing machine-readable instructions and a processor for executing the machine-readable instructions such that, when the processor executes the machine-readable instructions, it configures the module to implement the method of the first main aspect of the invention.

In a third main aspect, the invention provides a non-transitory computer-readable medium storing machine-readable instructions, wherein, when the machine-readable instructions are executed by a processor of a module in a communication system, they configure the processor to implement the method of the first main aspect of the invention.

The communications network/system may comprise a wireless communication network/system.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWING

The foregoing and further features of the present invention will be apparent from the following description of preferred embodiments which are provided by way of example only in connection with the accompanying figures, of which:

FIG. 1 is a block schematic diagram showing the CUPS system architecture in a 5G wireless communications network;

FIG. 2 is a simplified view of the UP and DP in a 5G CUPS system;

DESCRIPTION OF PREFERRED EMBODIMENTS

Figure 3:
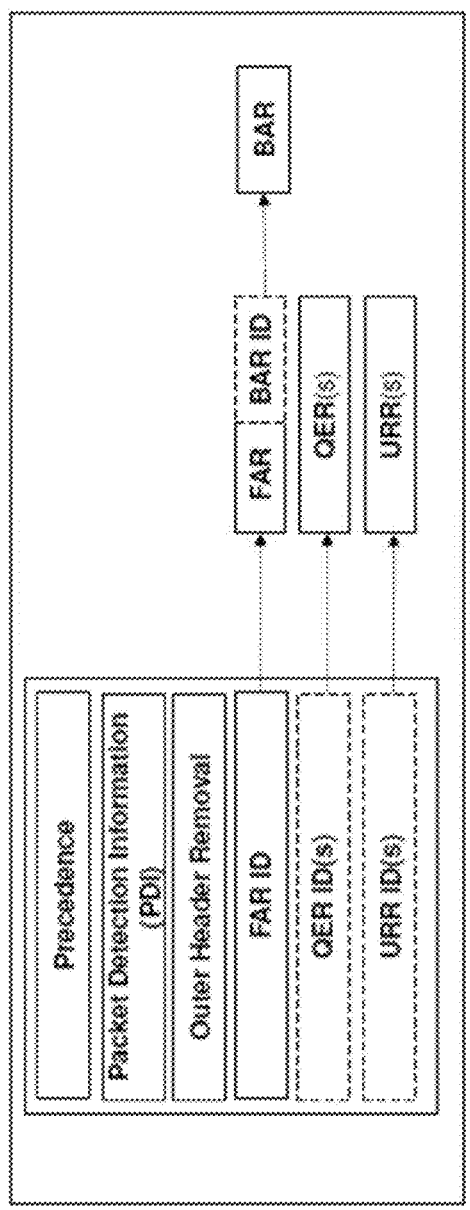
FIG. 3 illustrates the known Packet Detection Rule (PDR) structure for a UPF in a 5G CUPS system.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS., may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention is particularly useful for a 5G CUPS system which requires low latency and high processing throughput.

In the following description, embodiments, and methods according to the present will be described with respect to a 5G wireless communication network. However, it should be understood that the embodiments and methods of the invention are applicable to any packet detection rules-based communications system.

Referring to the drawings, FIG. 1 is a block schematic diagram showing the CUPS User Plane (UP) separation architecture 10 in a 5G wireless communications network. The Control Plane (CP) 12 comprising, for example, a Serving Gateway (SGW) 14, a Packet Data Network Gateway (PGW) 16 and a Session Management Function (SMF) 18 is separated from the UP 20 which comprises a plurality of UPFs 22 connecting a Radio Access Network (RAN) 24 to a Data Network (DN) 26. In an uplink (UL) direction, data packets received from network connected devices such as UEs (not shown) are communicated on the DP path 28 between the RAN 24 and DN 26. The data packets are communicated via the RAN 24 to the UPFs 22 typically as GPRS Tunneling Protocol User Plane (GTP-U) encapsulated Internet Protocol (IP) packets and then communicated by the UPFs 22 as IP packets to the DN 26. In a downlink (DL) direction, IP packets from the DN 26 are processed by the UPFs 22 and encapsulated as GTP-U packets for communication by the RAN 24 to the UEs.

The separation of the CP 12 from the UP 20 is facilitated by a number of signaling interfaces. These interfaces may include one or more "Sx" interfaces which comprise the defined interfaces between the CP 12 and DP 28 in the CUPS system 10 and one or more "N4" interfaces which comprise the interfaces between the SMF 18 and UPFs 22 in 5G. Furthermore, the RAN 24 is connected to the SGW 14 by a "S1-U" interface and the DN 26 is connected to the PGW 16 by a "SGi" interface.

In the UP 20, the RAN 24 is connected to the UPFs 22 by an "NY" communications interface, connections between UPFs 22 are facilitated by "N9" interfaces, and the DN 26 is connected to the UPFs 22 by an "N6" interface.

A skilled person will be familiar with the CUPS system architecture and the defined signaling and communication interfaces described above.

In the 5G CUPS system 10 of FIG. 1, GTP-U data packets on the UL will be processed in at least one UPF 22 and in as many as N UPFs 22, where N is an integer greater than 1. Performance of the UPFs 22 is critical within the CUPS system architecture 10 for efficient delivery of one or more types of data packet traffic. This is especially true where a multiplicity of N UPFs 22 are utilized.

FIG. 2 shows, by way of example, the 5G CUPS UP 20 with a UE 30 connected via a gNB 32 to the DN 26 via a plurality of N UPFs 22. By way of illustration, the large arrow 34 in FIG. 2 represents all data packet traffic flows through the UPFs 22 whereas the upper fine arrow 36 represents time sensitive live streaming traffic and the lower fine arrow 38 represents less time sensitive file transfer traffic.

There can be over 100,000 or more UEs 30 located on a single UPF 22 to transfer data packets simultaneously. The total amount of traffic processing through the UPF 22 could be significant at the gigabit (Gb) scale. Data packets are processed on multiple UPF(s) 22 along the DP path 28, and each UPF 22 may add additional latency to data packet processing. It is critical for time sensitive traffic to traverse with low latency along the DP path 28. It is desirable for the UPF module comprising the plurality of UPFs 22 to be able to differentiate different traffic flows such as, for example, the live streaming traffic 36 and the file transfer traffic 38 for different actions related to Quality of Service (QoS), charging, buffering, etc., on top of other performance requirements. Therefore, data packet processing performance such as throughput & latency for UPF processing is of considerable importance on the 5G DP path 28.

The present invention as hereinafter described provides at least one embodiment of an improved UPF module and at least one method performed by said UPF module to differentiate different traffic flows, to reduce the latency of packet processing on UPF, and/or to increase UPF packet processing throughput.

It is desirable that live streaming traffic is forwarded with a higher bit rate than other traffic flows, has a low packet drop rate and an Assured Forwarding classification. In contrast, file transfer traffic may be forwarded with a lower bit rate, higher drop rate and a Default Forward classification.

FIG. 3 illustrates the known Packet Detection Rule (PDR) structure for a 5G UPF module. The PDR is used in the UPFs of the UPF module to match an incoming data packet to associated instructions or rules, e.g., an instruction set or action set, and to then process that data packet in accordance with said matched instruction set. The matched instruction set comprises a Forward Action Rule (FAR) and optionally a combination of any one or more of: a Buffering Action Rule (BAR) containing information on how to buffer data; one or more Quality of Service (QoS) Enforcement Rules (QERs) for providing gating and QoS control, flow, and service level marking; and one or more Usage Reporting Rules (URRs) containing rules for counting and reporting traffic. Consequently, each PDR is associated with one FAR and zero or one BAR, zero or one or more QERs, and zero or one or more URRs. The PDR therefore matches an incoming data packet to an associated instruction set. Each PDR contains a Packet Detection Information (PDI) field which comprises one or more information fields against which an incoming data packet is matched.

Figure 4:
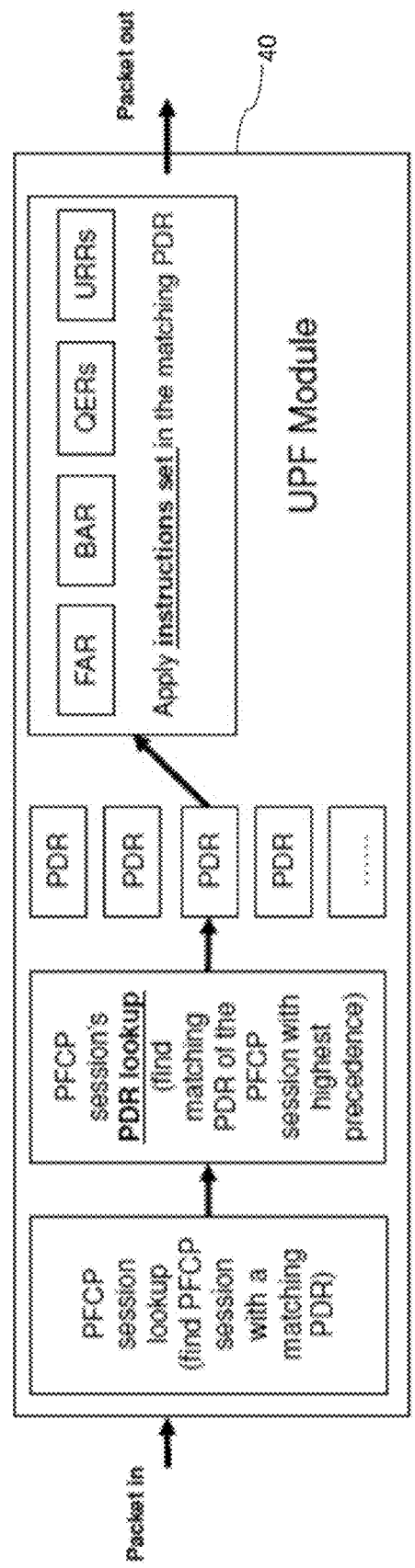
FIG. 4 is a functional block diagram of a UPF module in a 5G CUPS system.

FIG. 4 illustrates the known UPF processing of an incoming data packet to match said packet to its associated instruction set. The SMF 18 (FIG. 1) provisions one or more PDRs per Packet Forwarding Control Protocol (PFCP) session. An incoming data packet may comprise a GTP-U encapsulated data packet received on an N3 interface or an N9 interface or a non-GTP-U encapsulated data packet, e.g., an IP packet, received on an N6 interface. Only functions of one UPF are illustrated in the UPF module 40 of FIG. 4, but it will be understood that there may be as many as N UPFs in said UPF module 40. On receipt of the incoming data packet, a UPF of the N UPFs in the UPF module 40 first uses a PFCP lookup process to identify for said incoming data packet a PFCP session with one or more matching PDRs. Once a PFCP session with one or more matching PDRs is identified for said packet, the UPF uses a PDR lookup process to identify a PDR of said PFCP session with the highest precedence. The PDR with the highest precedence defines an associated instruction set used to process said incoming data packet. Each data packet in a data packet flow from a network device such as a UE or a DN server is processed in the same way in order to determine its associated instruction set. Consequently, this process is inefficient for a high throughput and low latency UPF as it requires the process to be followed for each incoming data packet. This presents many problems which the present invention seeks to overcome or at least reduce the impact of.

Figure 5:
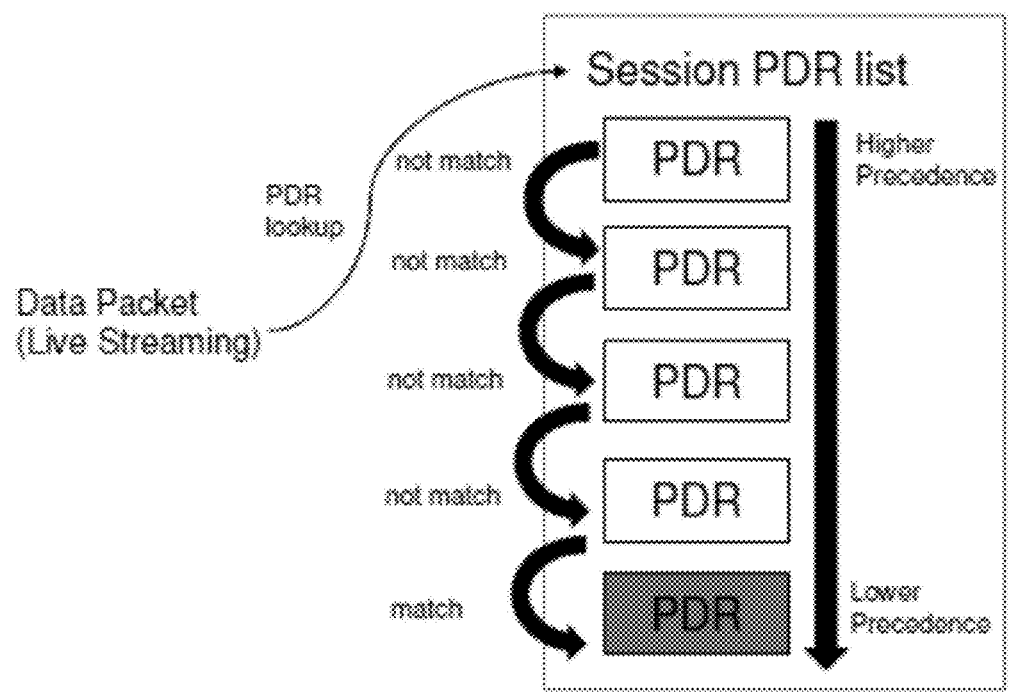
FIG. 5 illustrates the known PDR lookup process for a UPF in a 5G CUPS system.

One problem of the known method of data packet processing in a UPF is illustrated by FIG. 5 and is related to the PDR lookup process. The PDR lookup process comprises identifying a PDR with the highest precedence for the previously identified PFCP session. This requires finding the PDR with the highest precedence among all PDRs provisioned for said PFCP session, starting with the PDR having the highest precedence and working through said PDRs in order of highest to lowest precedence until a match is identified as depicted by the shaded PDR in the drawing. For one Packet Data Unit (PDU) session, there could be a large number of PDRs on each interface depending on the applications/services to be detected. Considering also a large number of connected UEs, each with up to 15 PFCP sessions, each session with a maximum of 64 data packet flows and each data packet flow with as many as 1024 filters, the number of PDRs to be detected can be huge. Consequently, a considerable amount of time is required for matching the highest precedence PDR for each incoming data packet. Furthermore, if there are many UPFs on the DP then the total time for matching the highest precedence PDR for each incoming data packet can also be huge. This is not desirable for data packet flows such as live streaming traffic.

Another problem of the known method of data packet processing in a UPF is related to the instruction set application process. It takes multiple search actions to process the instruction set for each incoming data packet. The instruction set comprises one FAR and may include a BAR, some QERs and/or some URRs. The operations to search and apply the instruction set are complex. For example, when processing the FAR for an incoming data packet on the UL, the UPF must (i) find the GTP-U header and then perform outer header creation/removal (FIG. 3), (ii) perform forwarding information base (FIB)/route lookup to find a next hop IP address for the data packet, and (iii) perform neighbor lookup to find the media access control (MAC) address of the nest hop address. So, for the FAR alone, there are three search actions to be performed which increases UPF latency and reduces data packet throughput.

Figure 6:
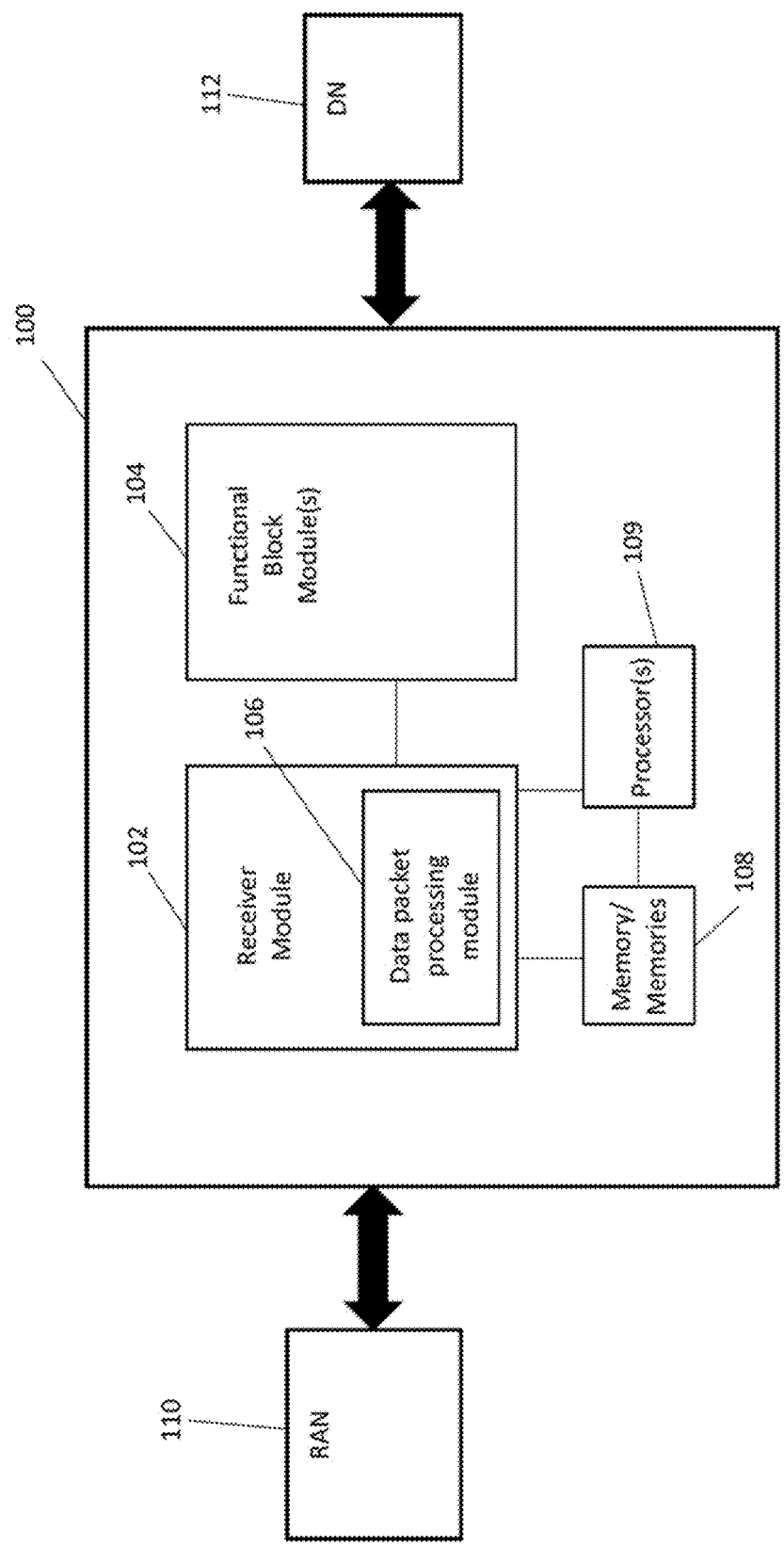
FIG. 6 is a block schematic diagram of a UPF module in accordance with the present invention.

FIG. 6 shows an exemplary embodiment of an improved UPF module 100 in accordance with concepts of the present invention. In the illustrated embodiment, the UPF module 100 may comprise communication equipment such as a network node, a network card, or a network circuit, etc. operating in a 5G communications system environment, although the improved UPF module 100 of the invention is not limited to operating in a 5G communications system but could comprise a UPF module 100 in any PDR based communications system or network. The UPF module 100 forms an interconnect network device between the RAN 110 and DN 112.

The UPF module 100 may comprise a plurality of functional blocks for performing various functions thereof. For example, the UPF module 100 includes receiver module 102 providing received signal processing and configured to provide received signals and/or information extracted therefrom to functional block module(s) 104 such as may comprise various data sink, control element(s), user interface(s), etc. Although receiver module 102 is described as providing received signal processing, it will be appreciated that this functional block may be implemented as a transceiver providing both transmitted and received signal processing. Irrespective of the particular configuration of receiver 102, embodiments include data packet processing module 106 disposed in association with the receiver module 102 for facilitating accurate processing and/or decoding of received data packets in accordance with the invention.

Although the data packet processing module 106 is shown as being deployed as part of the receiver module 102 (e.g., comprising a portion of the receiver module control and logic circuits), there is no limitation to such a deployment configuration according to the concepts of the invention. For example, the data packet processing module 106 may be deployed as a functional block of UPF module 100 that is distinct from, but connected to, receiver module 102. The data packet processing module 106 may, for example, be implemented using logic circuits and/or executable code/machine readable instructions stored in a memory 108 of the UPF module 100 for execution by a processor 109 to thereby perform functions as described herein. For example, the executable code/machine readable instructions may be stored in one or more memories 108 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 108 may comprise processor-readable memories for use with respect to one or more processors 109 operable to execute code segments of data packet processing module 106 and/or utilize data provided thereby to perform functions of the data packet processing module 106 as described herein. Additionally, or alternatively, the data packet processing module 106 may comprise one or more special purpose processors (e.g., application specific integrated circuit (ASIC), field programmable gate array (FPGA), graphics processing unit (GPU), and/or the like configured to perform functions of the data packet processing module 106 as described herein.

Figure 7:
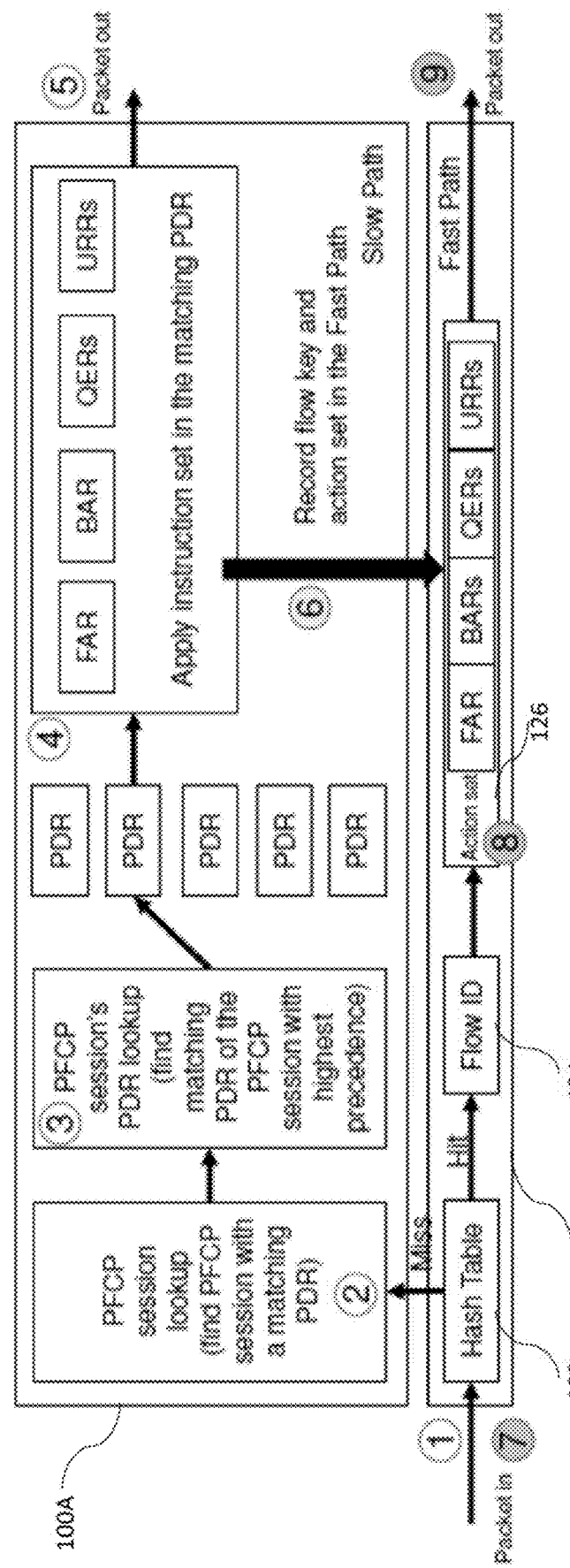
FIG. 7 is a functional block diagram of a first embodiment of a UPF module in accordance with the present invention.

FIG. 7 is a functional diagram illustrating a first embodiment 100A of the UPF module 100 of FIG. 6 and illustrating a first method performed by said UPF module 100A in accordance with the invention. The circled numerals in FIG. 7 denote the method steps of said first method in accordance with the invention and map to the steps of the flow diagram of said first method shown in FIG. 9. The UPF module 100A shows the functions of a single UPF, but it will be understood that the UPF module 100A could have as many as N UPFs.

The UPF module 100A differs from a conventional UPF module (FIG. 4) in that it is divided into a "slow path" and a "fast path". The "slow path" substantially comprises the conventional processing path of an incoming data packet as described with respect to FIGS. 1 to 5. The "fast path" comprises a modification of the UPF module 100A in accordance with the invention. The "fast path" is configured to at least by-pass the PDR search for second and subsequent incoming data packets of a data packet flow received from a network device such as a UE or a DN server (not shown). The "fast path" is also configured to by-pass the instruction set application or search process for said second and subsequent incoming data packets of said data packet flow. It does this in part by providing an agnostic flow key lookup method for incoming data packets of the data packet flow. As such, only the first data packet of the data packet flow is processed in the conventional manner including the known PDR search and the instruction set search processes whilst the second and subsequent data packets of the data packet flow by-pass the PDR search and the instruction set search which greatly reduces latency in the UPF processing of incoming data packets and greatly increases data packet throughput in the UPF module 100A.

Figure 9:
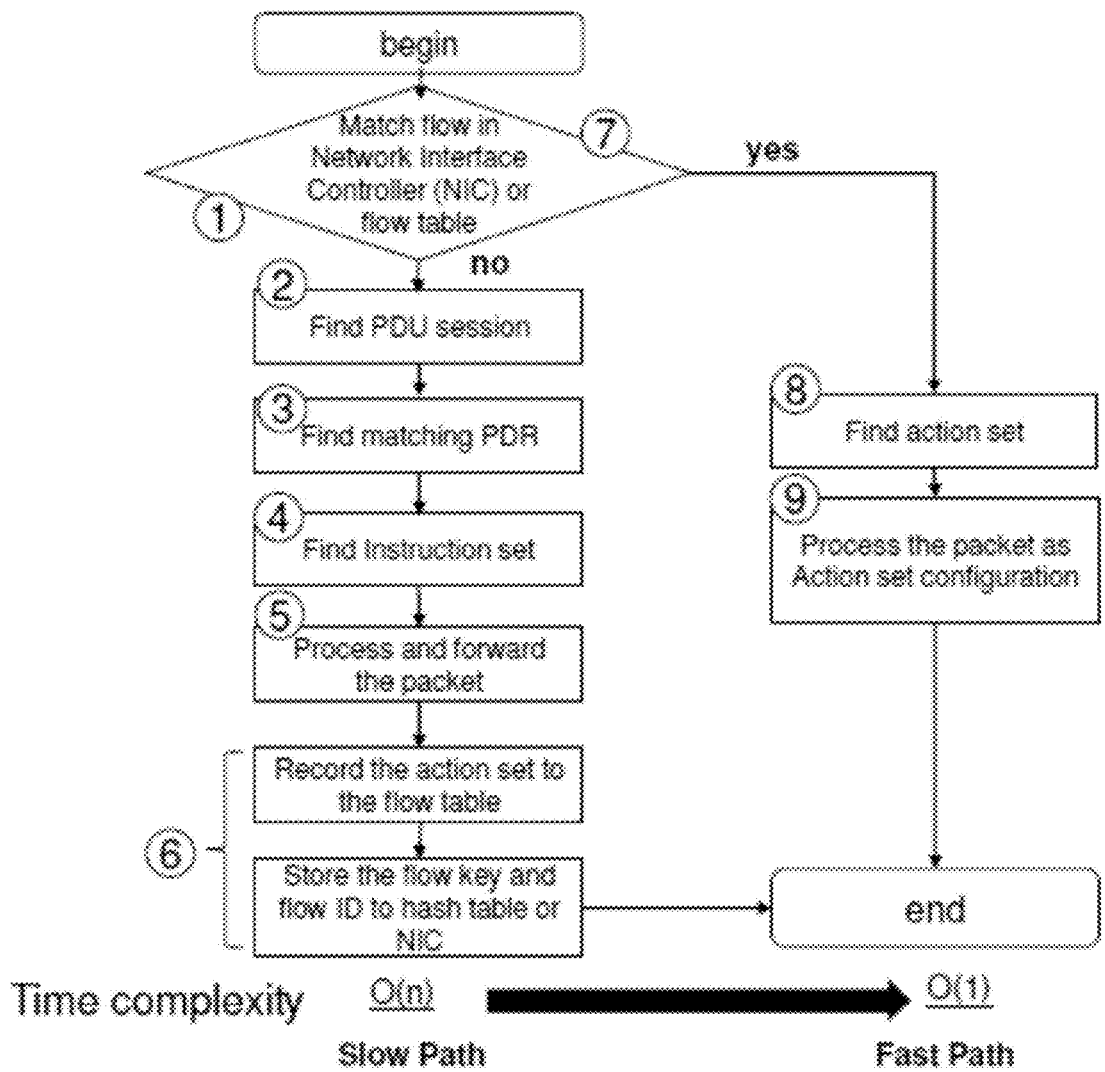
FIG. 9 is a flow diagram illustrating first and second methods respectively implemented by the first and second embodiments of the UPF module in accordance with the present invention.

In a first step of the first method in accordance with the invention denoted by the circled numeral 1 in FIGS. 7 and 9, the flow key of the first incoming packet of a data packet flow is searched in the hash table 122. A "miss" result is determined in the hash table 122 because, in this case, the flow key of said first incoming data packet will not have previously been encountered by the hash table 122. Consequently, the first incoming data packet will be processed through the "slow path" of the UPF module 100A in the conventional manner (FIGS. 1-5) following the steps denoted by the circled numerals 2-5 in FIGS. 7 and 9, said steps comprising finding a PDU session (PFCP session with matching PDRs), finding the matching PDR with the highest precedence, finding the associated instruction set matching the PDR with the highest precedence, and processing and forwarding the first data packet according to said associated instruction set.

The first method preferably includes the further step denoted by the circled numeral 6 in FIGS. 7 and 9 of storing the associated instruction set in the action set table 126 of the flow table module 120 and storing the flow key and flow ID to the hash table 122/flow ID table 124.

The first method continues with the step denoted by the circled numeral 7 in FIGS. 7 and 9 when receiving a data packet of the data packet flow by determining in said hash table 122 if a flow key of said data packet matches a flow key stored in the hash table 122. If a match is not determined then the data packet is also processed in the 1-N UPFs of the UPF module 100A in in the conventional manner (FIGS. 1-5) flowing the steps denoted by the circled numerals 2-5 in FIGS. 7 and 9. If, however, a match is determined then the first method moves to the step denoted by circled numeral 8 in FIGS. 7 and 9 of finding the associated action set for said data packet flow, i.e., the associated action set determined for the first incoming data packet. This step may include the hash table 122 providing the flow ID for a second or subsequent data packet to the flow table 124 thereby enabling the associated instruction set to be looked up in the flow table 124 and action set table 126 based on said flow ID for said second or subsequent data packet which will match the flow ID determined for the first incoming data packet which was previously stored in the flow table 124 linked to the associated instruction set in the action set table 126. The first method then moves to the step denoted by circled numeral 9 in FIGS. 7 and 9 to apply the associated instruction set to process and forward said second or subsequent data packet thereby by-passing the PDR search process and the instruction set search process as hereinbefore described and thereby mitigating or at least obviating the problems related to said search processes. The process of a searching function of the hash table 122 may be summarized by the steps: (i) check the flow key for a received data packet in the hash table 122 (this is the same for the first data packet and the second or subsequent data packet); (ii) if the flow key is not matched then process the received data packet in the conventional manner of the first method steps denoted by the circled numerals 2-5 in FIGS. 7 and 9; and (iii) if there is a match, process the received data packet in accordance with the first method steps denoted by circled numerals 8 and 9 in FIGS. 7 and 9.

It will be seen therefore that every packet of a data packet flow will be at least processed in the hash table 122 such that there is no difference between the steps of the first method denoted by the circled numerals 1 and 7, i.e., there is no difference at this point in the first method of processing the first data packet and processing the second or subsequent data packet.

It will be understood that the first method is applicable in both UL and DL directions through the DP and thus by-passes the PDR search and instruction set search processes for second and subsequent data packets in an incoming data packet flow for both second and subsequent GTP-U and IP packets which are processed through the UPF module 100A "fast path".

As illustrated in FIG. 9, the first method reduces time complexity of processing second and subsequent packets from a linear time O(n) to a constant time O(1) and thus leads to a reduction in packet processing latency in the 1-N UPFs of the UPF module 100A and to an increase in packet throughput in the 1-N UPFs of the UPF module 100A.

Figure 8:
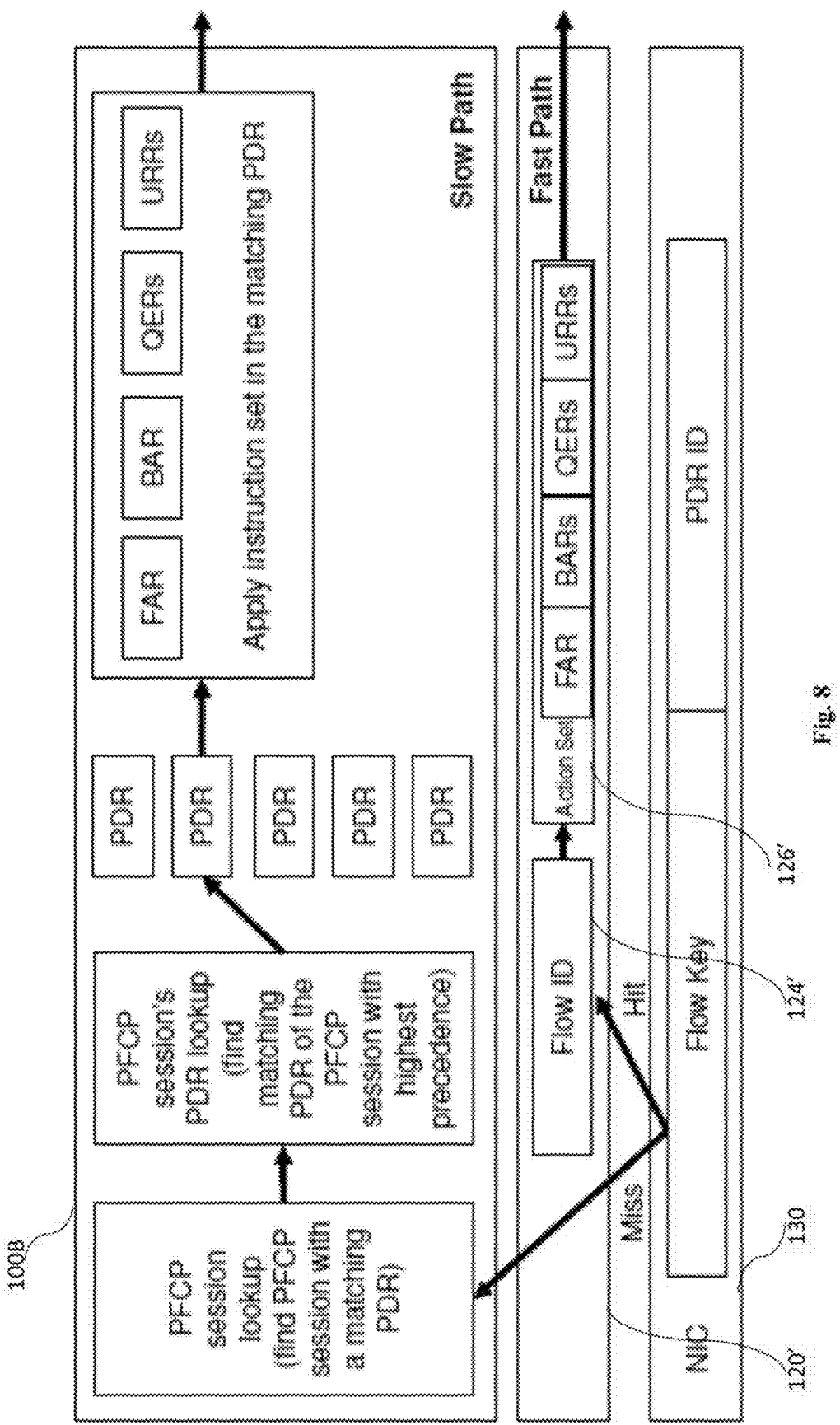
FIG. 8 is a functional block diagram of a second embodiment of a UPF module in accordance with the present invention.

FIG. 8 is a functional diagram illustrating a second embodiment 100B of the UPF module 100 of FIG. 6 and illustrating a second method performed by said UPF module 100B in accordance with the invention. The method steps of said second method in accordance with the invention also map to the steps of the flow diagram of FIG. 9 but with suitable modifications. The UPF module 100B shows the functions of a single UPF, but it will be understood that the UPF module 100B could have as many as N UPFs.

The UPF module 100B differs to the UPF module 100A of FIG. 7 in that it operates in a network environment where a Network Interface Controller (NIC) 130 supports flow key determination for incoming data packets at the UPFs. It will be understood that the NIC 130 does not comprise part of the UPF module 100B but is a separate network device. The UPF module 1001 interoperates with the NIC 130 in a similar manner to the internal interoperation of UPF module 100A of FIG. 7 with its flow table module 120.

In the second method of the invention implemented by UPF module 100B, the NIC 130 determines, in a first step denoted by numeral 1 in FIG. 9, the flow key of the first incoming packet of a data packet flow. A "miss" will result in the NIC 130 because the flow key of said first incoming data packet will not have previously been encountered by the NIC 130. Consequently, the first incoming data packet will be processed through the "slow path" of the UPF module 100B in the conventional manner (FIGS. 1-5) flowing the steps denoted by the numerals 2-5 in FIG. 9.

The second method preferably includes the further step denoted by the numeral 6 in FIG. 9 of the UPF module 100B storing the associated instruction set in the action set table 126' of its flow table module 120' and storing the flow key and flow ID in the NIC 130.

The second method continues with the step denoted by the numeral 7 in FIG. 9 in determining at the NIC 130 for a data packet of a data packet flow if a flow key of said data packet matches the flow key stored in the NIC 130. If a match is not determined, then the NIC 130 causes the UPF module 100B to process the data packet in the 1-N UPFs of the UPF module 100B in in the conventional manner (FIGS. 1-5) flowing the steps denoted by the numerals 2-5 in FIG. 9. If, however, a match is determined then the NIC 130 causes the UPF module 100B to move to the steps denoted by numerals 8 in FIG. 9 of finding the associated action set for said data packet flow, i.e., the associated action set determined for the first incoming data packet. This step may include the NIC 130 returning the flow ID from said flow ID table 124' for a second or subsequent data packet to the flow table of the UPF module 100B thereby enabling the associated instruction set to be looked up in the flow table 124' and the action set table 126' based on said flow ID for said second or subsequent data packet which will match the flow ID determined for the first incoming data packet which was previously stored in the flow table 124' linked to the associated instruction set stored in the action set table 126'. The second method them moves to the step denoted by numeral 9 in FIG. 9 to apply the associated instruction set for processing and forwarding said second or subsequent data packet thereby by-passing the PDR search process and the instruction set search process as hereinbefore described and thereby mitigating or at least obviating the problems related to said search processes.

It will be understood that the second method is also applicable in both UL and DL directions through the DP and provides the same technical benefits by mitigating or at least obviating the technical problems hereinbefore described.

Figure 10:
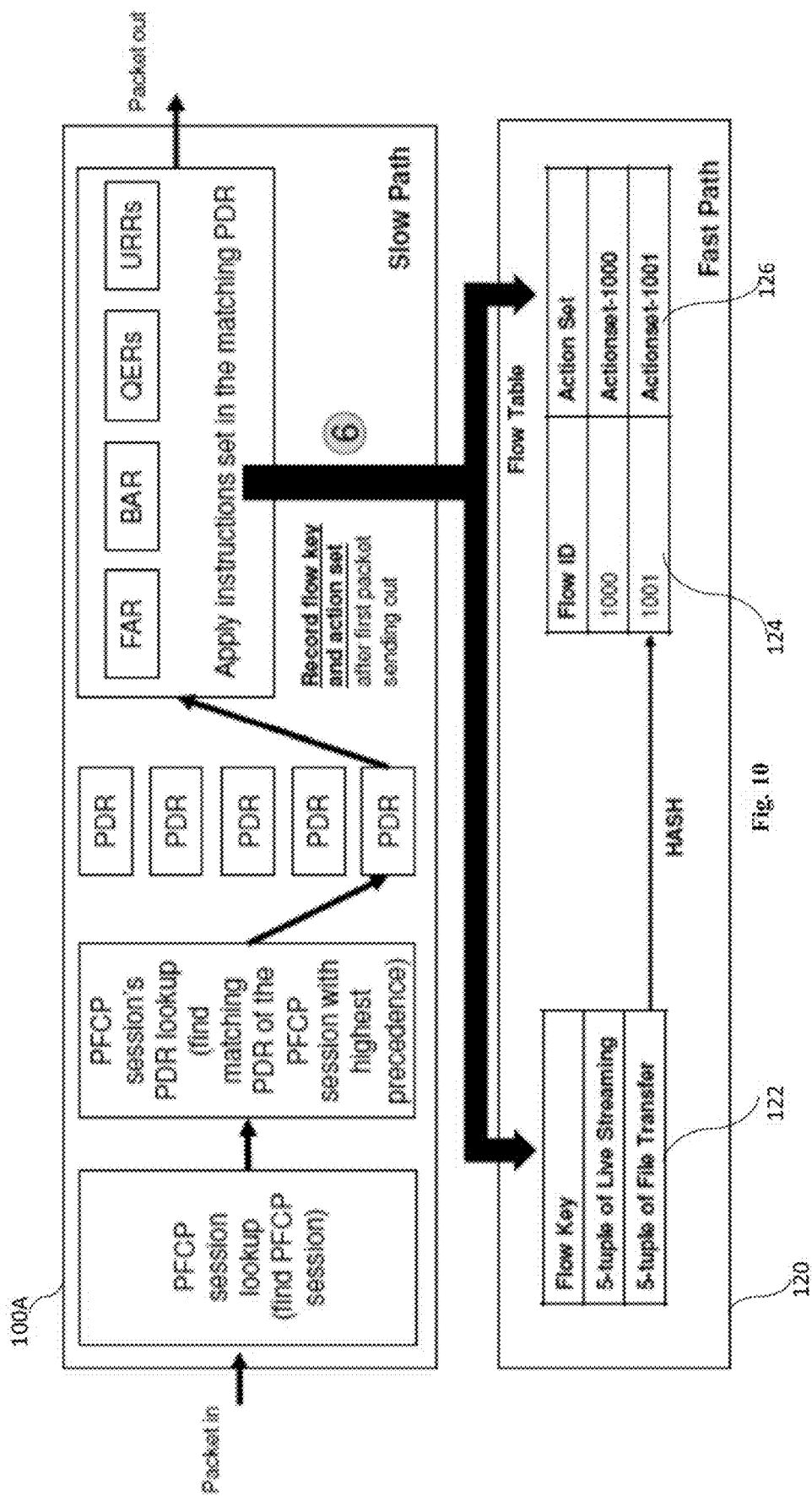
FIG. 10 is a further functional block diagram of the first embodiment of a UPF module in accordance with the present invention showing a structure of the flow table module.

FIG. 10 is a further functional diagram of the first embodiment of the UPF module 100A showing in more detail the flow table module 120 arrangement for storing the flow key in the hash table 122 and storing the flow ID and associated instruction set in the flow table 124 and action reset table 126 of the "fast path" in accordance with the step of the first method denoted by circled numeral 6 in FIGS. 7 and 9. The flow key for each data packet flow is optionally composed of 5 tuples of packets. More specifically, a UE network packet flow received at said UPF module 100A from a source UE may be identified by characteristics of the Network layer and Transport layer of the network packet, and optionally by 5 tuples of the network packet including source IP address/port number, destination IP address/port number and protocol number. The instruction set is denoted in FIG. 10 as the "Action Set". Each "Action Set" for an incoming data packet flow has associated with it a respective "Flow ID". The flow IDs are derived from the flow keys and may comprise hash values of the flow keys.

Figure 11:
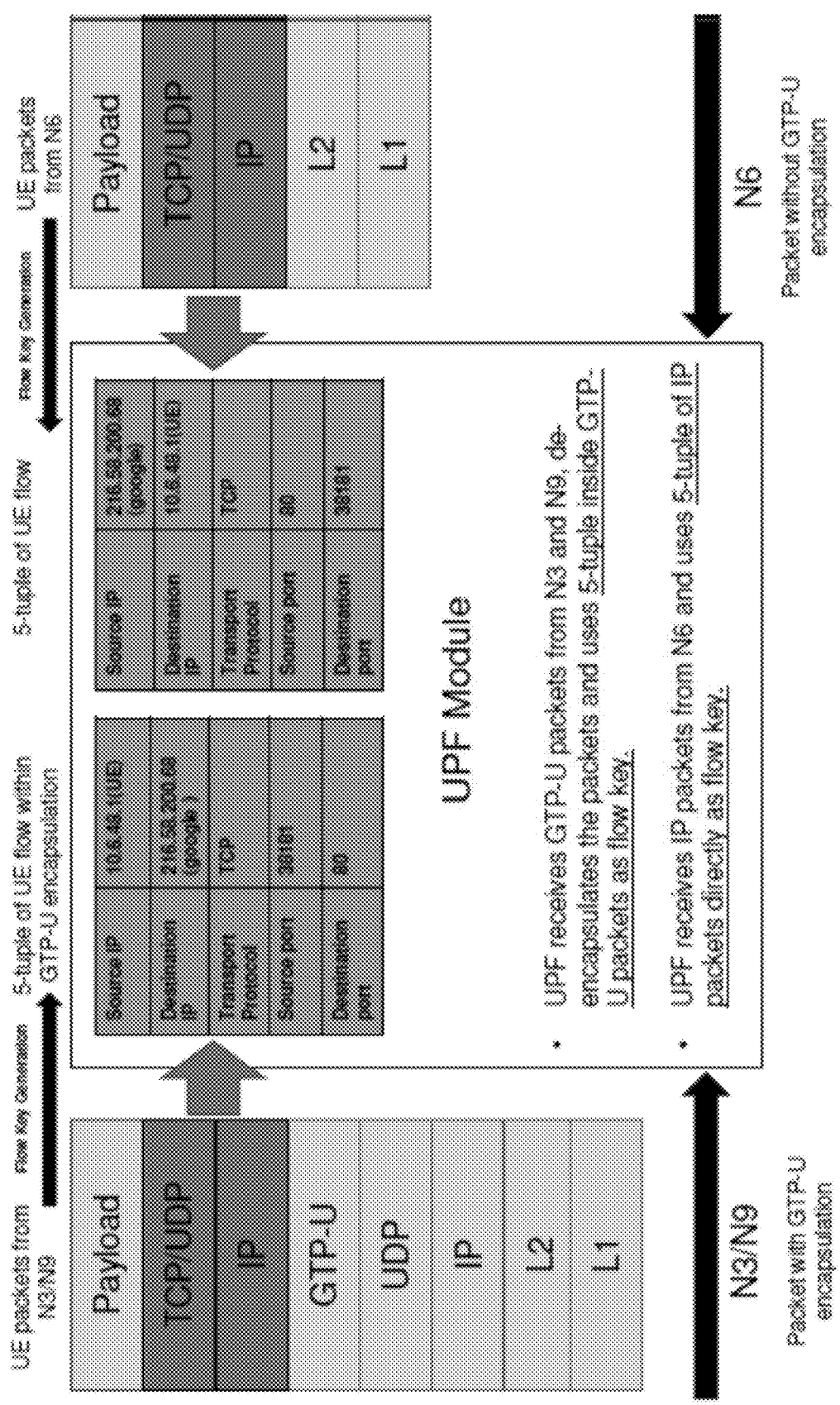
FIG. 11 is a diagram illustrating flow key derivation for incoming data packets in a UPF module in accordance with the present invention.

FIG. 11 more fully illustrates a preferred determination of flow keys for incoming data packet flows. This is applicable to both the first and second embodiments of the UPF module 100 A, B of FIGS. 7 and 8, respectively. For UL packets, one of the 1-N UPFs of the UPF module 100 A, B receives a GTP-U packet on an N3 or N9 interface, de-encapsulates the packet and then uses a 5-tuple from inside the GTP-U packet as the flow key. For DL packets, one of the 1-N UPFs of the UPF module 100 A, B receives an IP packet on an N6 interface then uses a 5-tuple from the IP packet as the flow key. It will be appreciated, however, that other combinations of tuples from inside the data packets may be used as the flow keys and/or other data from within said packets. It is only necessary that the flow key uniquely identifies a data packet flow of which a received data packet forms part and such that the flow key enables the NIC 130 or UPF module 100 A, B to determine which data packet flow a second or subsequent data packet belongs to so that the instruction set determined for a first received data packet from a particular data packet flow can be applied to the second and subsequent data packets of that data packet flow through the "fast path" of the UPF module 100 A, B.

Figure 12:
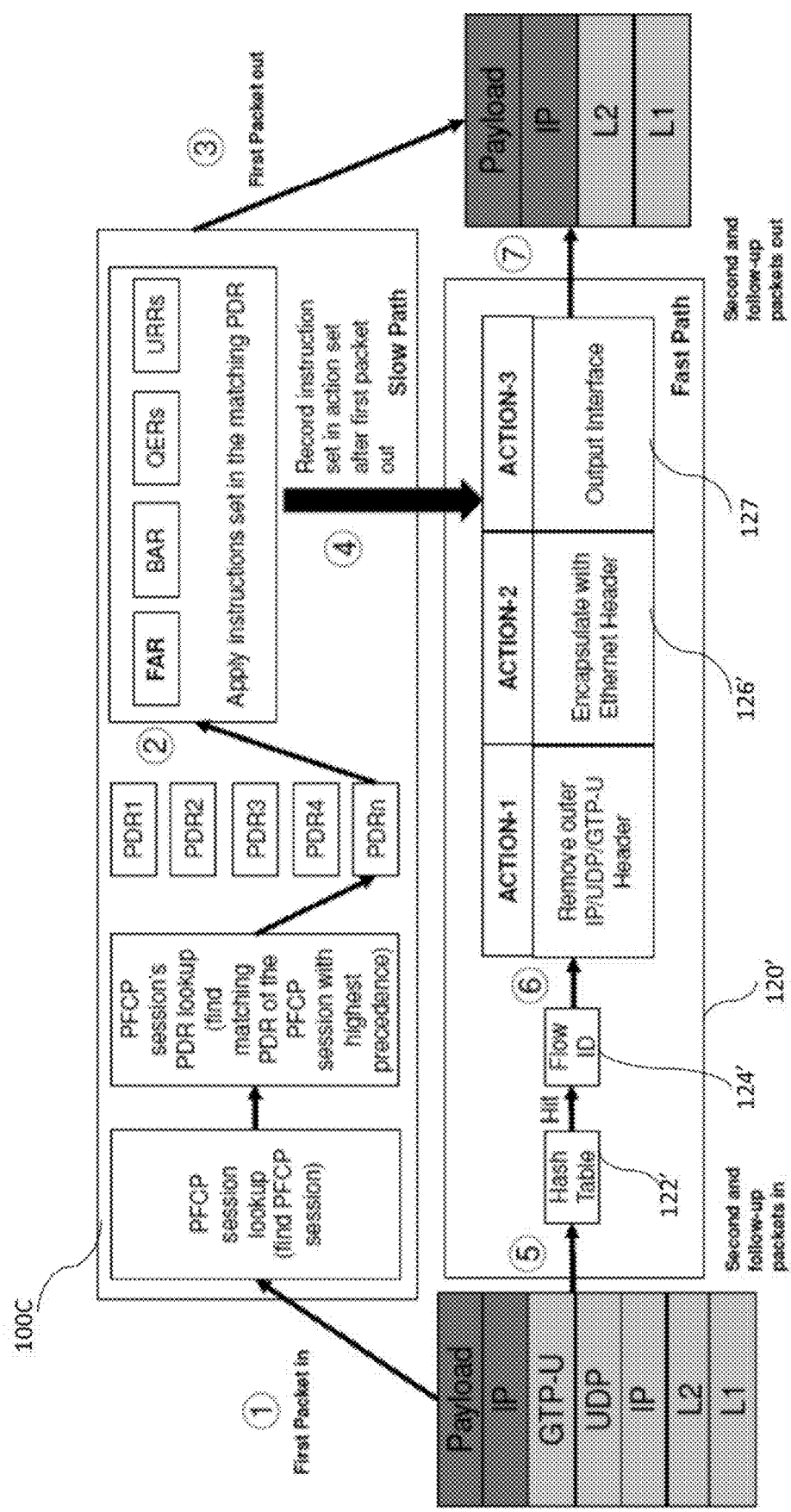
FIG. 12 is a functional block diagram of a further embodiment of a UPF module in accordance with the present invention for processing incoming GTP-U data packets.

FIG. 12 shows another embodiment of a UPF module 100C in accordance with the invention illustrating action set generation and application for incoming GTP-U data packets. A first incoming data packet of a data packet flow is processed in a conventional manner (FIGS. 1-5) as denoted by circled numerals 1-3 in the drawing to thereby determine an associated instruction set for processing and forwarding said first data packet. As before, the mapped flow key and flow ID for said first data packet are stored in the NIC (not shown) and/or flow table module 120' and the mapped flow ID and associated instruction set are stored in the flow ID table 124' and action set table 126' as denoted by circled numeral 4 in the drawing.

In the further description of FIG. 12, it is assumed that the NIC is not available and that the flow table module 120' processes flow keys for incoming packets.

For a second or subsequent data packet of the data packet flow, the hash table 122' determines, as denoted by circled numeral 5 in FIG. 12, if the flow key of said second or subsequent data packet matches the flow key derived from the first data packet of the same data packet flow stored in the hash table 122'. If no match is determined, the second or subsequent data packet is processed through the "slow path" in a conventional manner. If a match is determined, the hash table 122' forwards the second or subsequent packet's flow ID to the flow table 124' where, as denoted by circled numeral 6, the flow table 124' and action reset table 126' match an associated instruction set to the flow ID.

It will be understood that the flow table 124' and action set table 126' link multiple matched flow IDs with their respective associated instruction sets or action sets.

In this embodiment, the action set table includes a generated action set for each flow 1D for processing matched second or subsequent data packets of the data packet flows. The generated action set for each flow ID includes the matched associated instruction set. The generated action set preferably comprises a first action "ACTION-1" of removing an outer header from the second or subsequent data packet. This may comprise removing the outer IP/UDP/GTP-U header. A second action "ACTION-2" of the generated action set preferably comprises encapsulating the second or subsequent data packet now lacking its outer header with an Ethernet header. A third action "ACTION-3" comprises an output interface 127 for the flow ID to process and forward said second or subsequent data packet.

Figure 13:
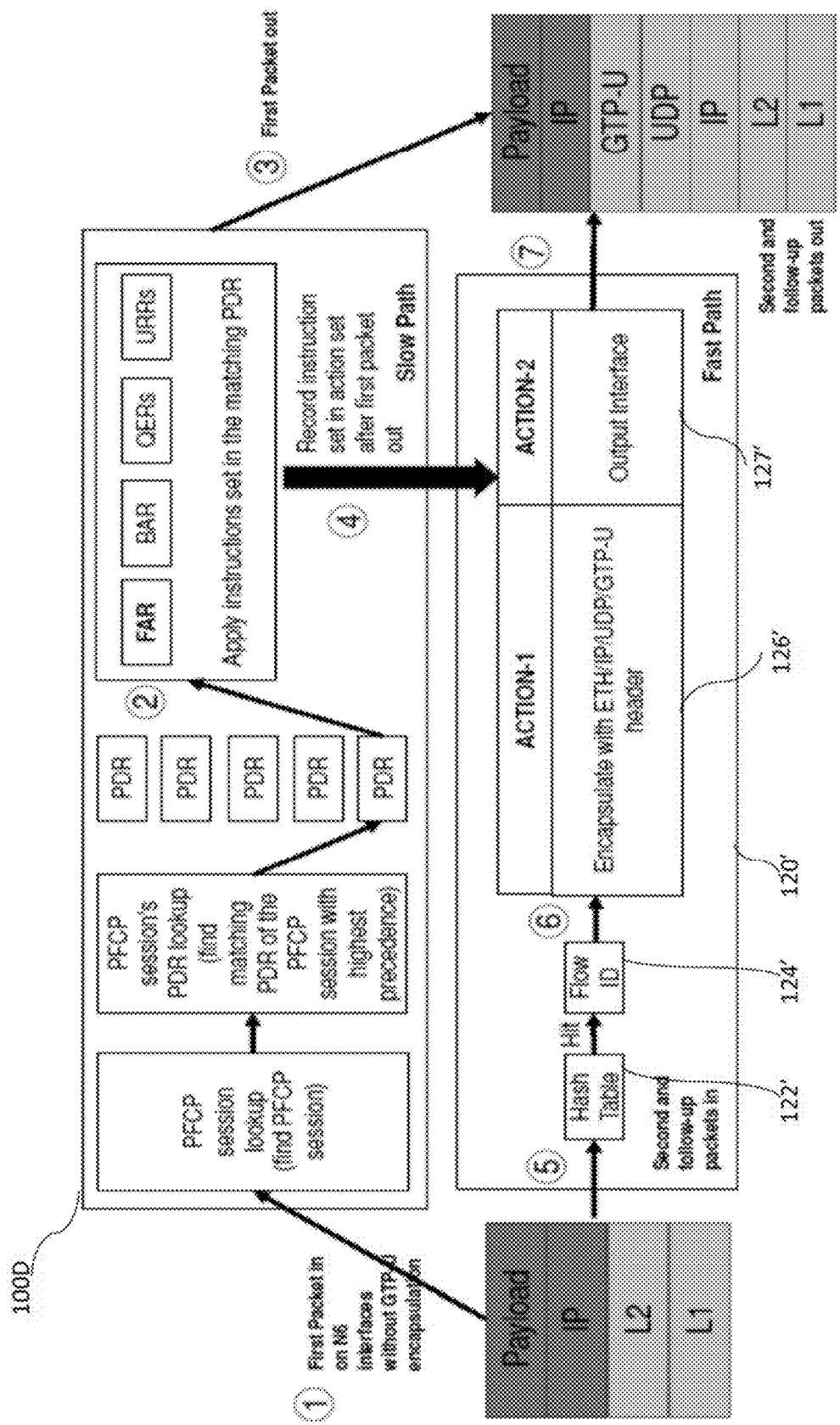
FIG. 13 is a functional block diagram of a yet further embodiment of a UPF module in accordance with the present invention for processing incoming IP data packets.

In a similar manner to FIG. 12, FIG. 13 shows another embodiment of a UPF module 100D in accordance with the invention illustrating action set generation and application for incoming 1P data packets. Once again, a first incoming data packet of a data packet flow is processed in a conventional manner (FIGS. 1-5) as denoted by circled numerals 1-3 in the drawing to thereby determine an associated instruction set for processing and forwarding said first data packet. As before, the mapped flow key and flow ID for said first data packet are stored in the NIC (not shown) and/or flow table module 120' and the mapped flow ID and associated instruction set are stored in the flow ID table 124' and action set table 126' as denoted by circled numeral 4 in the drawing.

In the further description of FIG. 13, it is also assumed that the NIC is not available and that the flow table module 120' processes flow keys for incoming packets.

For a second or subsequent data packet of the data packet flow, the hash table 122' determines, as denoted by circled numeral 5 in FIG. 13, if the flow key of said second or subsequent data packet matches the flow key derived from the first data packet stored in the hash table 122'. If no match is determined, the second or subsequent data packet is processed through the "slow path" in a conventional manner. If a match is determined, the hash table 122' forwards the second or subsequent packet's flow ID to the flow table 124' where, as denoted by circled numeral 6, the flow table 124' and the action reset table 126' match an associated instruction set to the flow ID.

In this embodiment, the action set table 126' includes a generated action set for each flow ID for processing matched second or subsequent data packets of the data packet flows. The generated action set preferably comprises a first action "ACTION-1" of outer header creation of non-GTP-U incoming data packets by encapsulating the second or subsequent data packet with a GTP-U header, e.g., an ETH/IP/UDP/GTP-U header. A second action "ACTION-2" of the generated action set comprises the output interface 127' for the flow ID for processing and forwarding said second or subsequent data packet.

Figure 14:
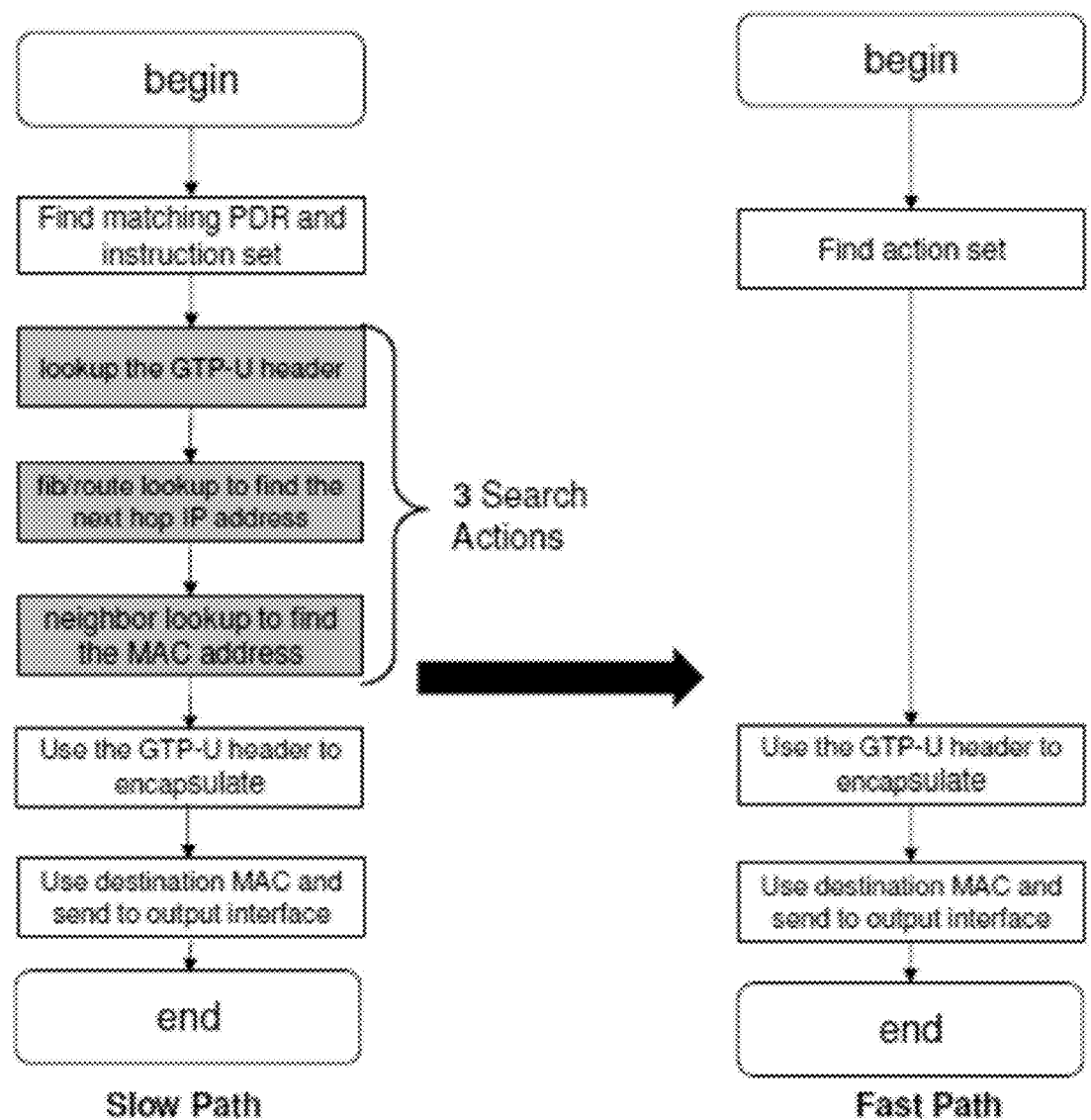
FIG. 14 is a flow diagram contrasting "slow path" and "fast path" methods in the UPF module of FIG. 13.

Applying the generated action set to second or subsequent data packets of a received data packet flow removes the need to do any lookup processes as illustrated by the flow diagram of FIG. 14, because each of the second and subsequent data packets will share the same generated action set for processing and forwarding of said packets through the UPF module 100D.

Referring to FIG. 14 which provides a comparison of the data packet processing steps through the "slow path" and the "fast path" of the UPF module 100D, it can be seen that the search actions in the "slow path" comprising: (i) finding the GTP-U header, (ii) using forwarding information base (FIB)-route lookup to find a next hop IP address for the data packet, and (iii) using neighbor lookup to find the media access control (MAC) address of the nest hop address are not required in the "fast path" because, using FAR outer-header creation as an example, the GTP-U/UDP/IP/ETH header and destination MAC/output interface are stored in the generated action set.

Figure 15:
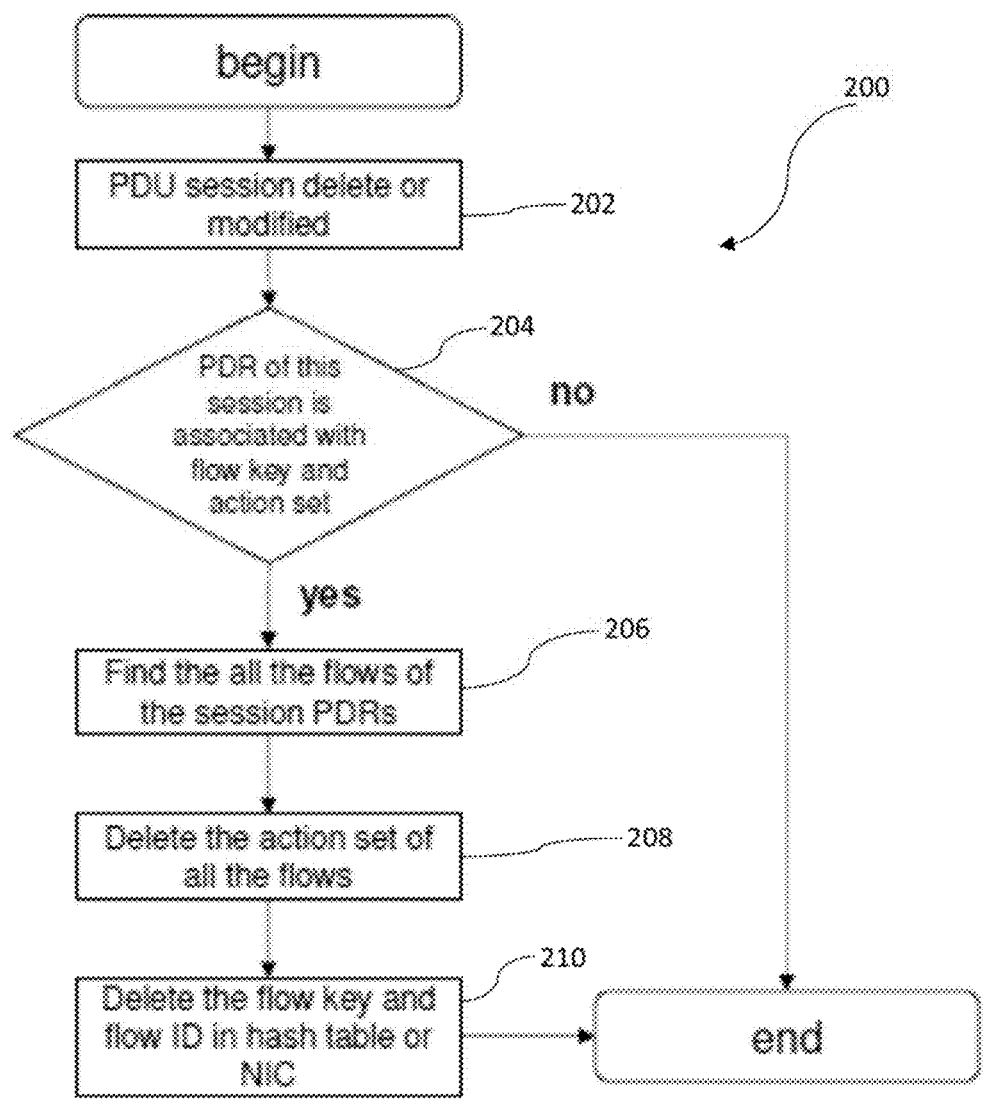
FIG. 15 is a flow diagram of a method for updating the flow table and/or NIC when a PDU session is modified or deleted.

Referring to FIG. 15, shown is a flow diagram of a method 200 implemented by (any embodiment of) the UPF module 100 when a PDU session in the flow table is deleted or modified thereby requiring the flow table to be updated.

Where a PDU session is determined to have been modified or deleted as in step 202, the method includes determining at step 204 if a PDR of the PDU session is associated with any flow key and instruction set or action set. If a negative determination is made, then the method ends as there is no requirement to update the flow table. However, if a positive determination is made, then the method includes step 206 of finding all of the data packet flows of the session PDRs. Once all of the flows of the session PDRs are found, the method includes step 208 of deleting the matched instruction set or action set of all of the flows and this is followed by step 210 of deleting the flow key and flow ID from the hash table/flow table and/or NIC, after which the method terminates.

Figure 16:
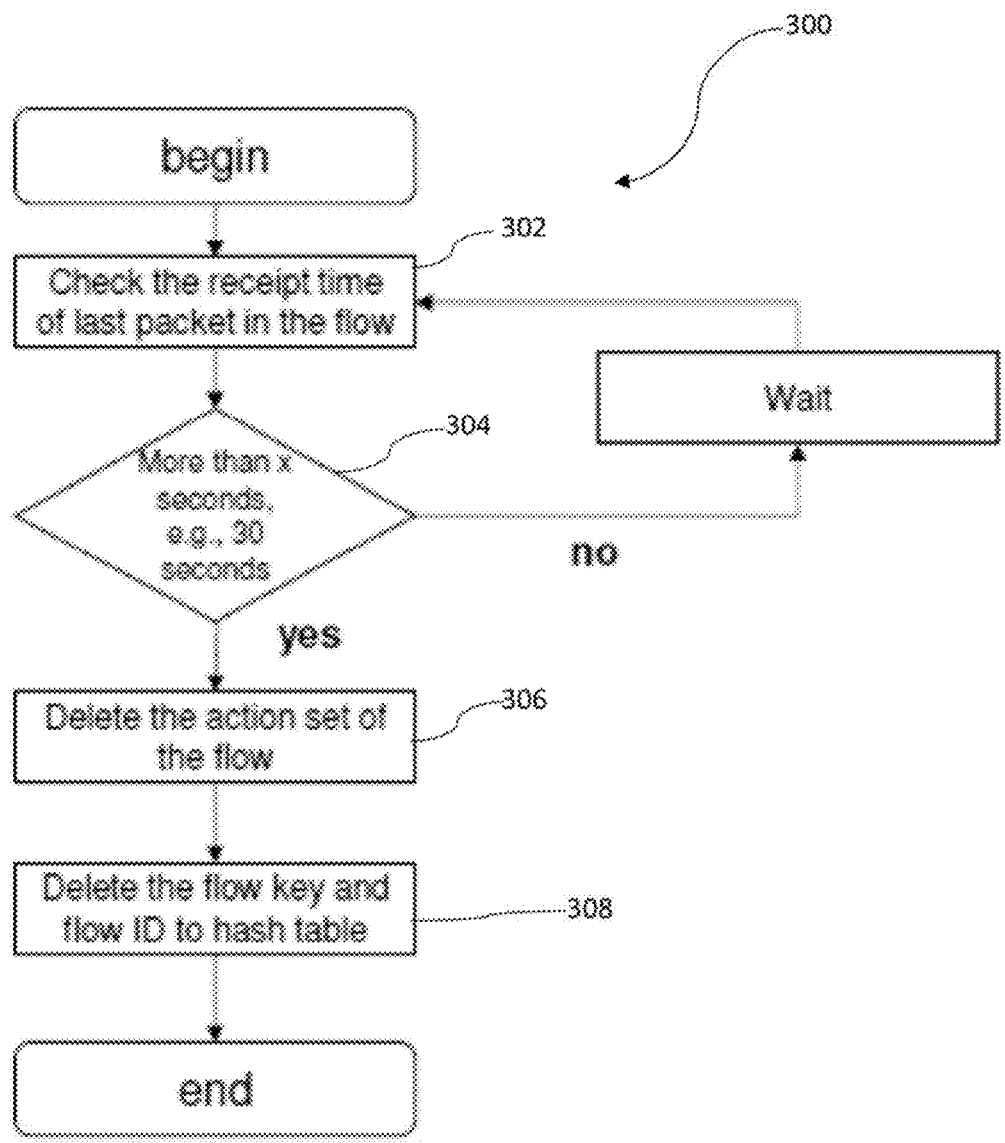
FIG. 16 is a flow diagram of a method for updating the flow table and/or NIC when a d flow entry in the flow table has a timeout greater than a set time period.

Referring to FIG. 16, shown is a flow diagram of a method 300 implemented by all embodiments of the UPF module 100 when a flow entry in the flow table has a timeout greater than a predetermined, calculated, or selected time period. For example, in some embodiments, the time period may be set at 30 seconds. The method begins at step 302 with determining a receipt time of a last received packet of a data packet flow. Then, at step 304, a determination is made about whether or not the time of receipt of said last received packet is greater than the predetermined, calculated, or selected time period. If no, the method waits for receipt of a next data packet. If yes, the method includes step 306 of deleting the matched instruction set or action set of all of the data packet flow from the flow table and then step 308 of deleting the flow key and flow ID from the hash table/flow table and/or NIC, after which the method terminates.

In one embodiment, the method of the invention may comprise the following steps:
- Step 1: First data packet of the data packet flow arrives at the UPF module:
  - Sub-step 1-1: PFCP session lookup.
  - Sub-step 1-2: PDR lookup.
  - Sub-step 1-3: Instruction set lookup in PDR.
  - Sub-step 1-4: Process the packet with the instructions set found.
- Step 2: Record the mapping of the flow ID and instruction set/action set.
- Step 3: Record the mapping of the flow key and flow ID.
- Step 4a (Optional): Store the mapping relationship flow information and flow ID in the NIC support flow classification.
- Step 4b: If the NIC does not support this feature then the UPF module will record the mapping of flow key and flow ID in flow table.
- Step 5a (Optional): NIC will return the flow ID if next packet of the same flow arrives.
- Step 5b: Match the flow ID in the flow table if next packet of the same flow arrives.
- Step 6: Find instruction set/action set by flow ID.
- Step 7: Process the packet according to the found instruction set/action set.

The present invention therefore provides a method of processing data packets in a communications network. The method comprises receiving a first data packet of a data packet flow from a network device and determining an instruction set for processing said first data packet. A flow key for said first data packet is determined. The first data packet is processed according to the determined instruction set. The method includes receiving a subsequent data packet and determining if a flow key of said subsequent data packet matches said flow key of said first data packet. If yes, the subsequent data packet is processed using the instruction set determined for said first data packet.

The step of determining an instruction set for processing said first data packet may comprise: on receiving said first data packet of said data packet flow from said network device, looking up a Packet Forwarding Control Protocol (PFCP) session table to identify a PFCP session for said first data packet: using said identified PFCP session to determine a Packet Detection Rule (PDR) with a highest precedence for said PFCP session; and looking up an instruction set related to said determined PDR and using said looked up instruction set as the instruction set for processing said first data packet.

The PFCP session table lookup step may utilize Fully Qualified Tunnel Endpoint Identifier (F-TEID) including Tunnel Endpoint Identifier (TEID) and destination UPF IP for finding a PFCP session of GTP-U encapsulated packets received from a gNodeB.

The PFCP session table lookup step may utilize destination UE IP for finding PFCP session of non-GTP-U encapsulated packets received from a data network (DN).

The step of determining an instruction set for processing said subsequent data packet preferably does not require the step of using the identified PFCP session to determine a PDR with a highest precedence for said PFCP session and/or preferably does not require the step of looking up an instruction set related to said determined PDR.

The present invention provides an increase the efficiency of the UPFs in a 5G communication network, increase in UPF performance and throughput, reduction in UPF packet processing latency.

The embodiments of the present invention may be implemented as low cost, hardware, middleware, or software-based implementations.

In one embodiment, the PFCP session lookup uses Fully Qualified Tunnel Endpoint Identifier (F-TEID) including Tunnel Endpoint Identifier (TEID) and destination UPF IP for finding the PFCP session of GTP-U packets received from a gNB on an N3 interface and/or GTP-U packets received from another UPF on an N9 interface.

In one embodiment, the PFCP session lookup uses destination UE IP for finding the PFCP session of non-GTP-U encapsulated packets received from the DN on an N6 interface.

In one embodiment, the PDR lookup uses characteristics of transport/network layer in network packets and optionally 5 tuples of the network packets including source IP address/port number, destination IP address/port number and protocol number, and/or the PDR lookup uses characteristics of application layer in network packets and optionally uses Uniform Resource Locator (URL) in Hypertext Transfer Protocol (HTTP) application layer.

In one embodiment, the flow key for GTP encapsulated traffic comprises characteristics of the IP packet which is de-encapsulated from the original GTP packet, and optionally 5 tuples of said IP packet including source IP address/port number, destination IP address/port number and protocol number.

In one embodiment, the flow key for non-GTP-U encapsulated packets comprises characteristics of the IP packet, and optionally 5 tuples of said IP packet including source IP address/port number, destination IP address/port number and protocol number.

In one embodiment, the flow ID is a sequence number increasing at every new flow entry added into the flow table.

In one embodiment, the action set records all the behaviors for processing the first network packet in an incoming data packet flow using the instruction set found in the matching PDR.

In one embodiment, the 1-N UPFs in the UPF module use a hardware NIC which support flow key calculation whereby the 1-N UPFs will respectively record flows on the NIC by sending flow key and flow ID data to the NIC.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of processing data packets in a communications network, the method comprising:
 receiving a first data packet of a data packet flow from a network device;
 determining an instruction set for processing said first data packet;
 determining a flow key for said first data packet;
 processing said first data packet according to the determined instruction set;
 receiving a subsequent data packet;
 determining if a flow key of said subsequent data packet matches said flow key of said first data packet; and
 if yes, processing said subsequent data packet using the instruction set determined for said first data packet;
 wherein determining an instruction set for processing said first data packet comprises:
  on receiving said first data packet of said data packet flow from said network device, looking up a Packet Forwarding Control Protocol (PFCP) session table to identify a PFCP session for said first data packet;
  using said identified PFCP session to determine a Packet Detection Rule (PDR) with a highest precedence for said PFCP session; and
  looking up an instruction set related to said determined PDR.

2. The method of claim 1, wherein, if the step of determining if a flow key of said subsequent data packet matches said flow key of said first data packet returns a negative determination, then processing said subsequent data packet by:
 determining an instruction set for processing said subsequent data packet; and
 processing said subsequent data packet using the instruction set determined for said subsequent data packet.

3. The method of claim 1, including the step of deriving a flow identity (ID) for said first data packet, wherein the flow ID for said first data packet comprises a hash value derived from said flow key.

4. The method of claim 3, wherein said flow key for said first data packet comprises packet header data of said first data packet and the flow ID comprises a hash value derived from the packet header data comprising said flow key.

5. The method of claim 4, wherein the flow key comprises selected tuples from the packet header data of said first data packet.

6. The method of claim 5, wherein the selected tuples include an inner packet header of said first data packet when said first data packet is part of a GTP data packet flow.

7. The method of claim 4, wherein the flow ID of said first data packet and the instruction set determined for said first data packet are recorded after the first data packet is processed according to said instruction set.

8. The method of claim 4, wherein the flow key and the flow ID of said first data packet are stored in a Network Interface Controller (NIC) and/or a flow table of a User Plane Function (UPF) module.

9. The method of claim 8, wherein the step of determining if a flow key of said subsequent data packet matches said flow key of said first data packet comprises matching the flow key of said first data packet with the flow key of said subsequent data packet in the NIC on detecting by the NIC that the subsequent data packet belongs to the same data packet flow as the first data packet.

10. The method of claim 9, wherein the step of matching the flow key of said subsequent data packet with the flow key of said first data packet in the NIC includes the NIC sending the flow ID of said subsequent data packet to the flow table of the UPF module.

11. The method of claim 8, wherein the flow ID of said first data packet and the instruction set determined for said first data packet are stored in said UPF module flow table.

12. The method of claim 11, wherein the step of determining if a flow key of said subsequent data packet matches said flow key of said first data packet comprises matching the flow key of said subsequent data packet with the flow key of said first data packet stored in said UPF module flow table.

13. The method of claim 1, wherein the PFCP session table lookup step utilizes Fully Qualified Tunnel Endpoint Identifier (F-TEID) including Tunnel Endpoint Identifier (TEID) and destination UPF IP for finding a PFCP session of GTP-U encapsulated packets received from a gNodeB.

14. The method of claim 1, wherein the step of determining an instruction set for processing said subsequent data packet does not require at least the step of claim 11 of using the identified PFCP session to determine a PDR with a highest precedence for said PFCP session.

15. The method of claim 1, wherein the step of determining an instruction set for processing said subsequent data packet does not require at least the step of claim 11 of looking up an instruction set related to said determined PDR.

16. The method of claim 1, including the step of:
if a Protocol Data Unit (PDU) session associated with the data packet flow from the network device is modified or deleted then deleting the flow ID and/or the instruction set.

17. The method of claim 1, including the steps of:
determining a time of receipt of a subsequent data packet of said data packet flow from the network device; and
if the time of receipt is greater than a predetermined, selected, or calculated time period after receipt of a previous data packet of said data packet flow then deleting the flow ID and/or the instruction set.

18. A module in a communication network for processing data packets, said module comprising:
a memory storing machine-readable instructions; and
a processor for executing the machine-readable instructions such that, when the processor executes the machine-readable instructions, it configures the module to:
receive a first data packet of a data packet flow from a network device;
determine an instruction set for processing said first data packet;
determine a flow key for said first data packet;
process said first data packet according to the determined instruction set;
receive a subsequent data packet;
determine if a flow key of said subsequent data packet matches said flow key of said first data packet; and
if yes, processing said subsequent data packet using the instruction set determined for said first data packet;
wherein determining an instruction set for processing said first data packet comprises:
on receiving said first data packet of said data packet flow from said network device, looking up a Packet Forwarding Control Protocol (PFCP) session table to identify a PFCP session for said first data packet;
using said identified PFCP session to determine a Packet Detection Rule (PDR) with a highest precedence for said PFCP session; and
looking up an instruction set related to said determined PDR.

19. A non-transitory computer-readable medium storing machine-readable instructions, wherein, when the machine-readable instructions are executed by a processor of a module in a communication system, they configure the processor to:
receive a first data packet of a data packet flow from a network device;
determine an instruction set for processing said first data packet;
determine a flow key for said first data packet;
process said first data packet according to the determined instruction set;
receive a subsequent data packet;
determine if a flow key of said subsequent data packet matches said flow key of said first data packet; and
if yes, processing said subsequent data packet using the instruction set determined for said first data packet;
wherein determining an instruction set for processing said first data packet comprises:
on receiving said first data packet of said data packet flow from said network device, looking up a Packet Forwarding Control Protocol (PFCP) session table to identify a PFCP session for said first data packet;
using said identified PFCP session to determine a Packet Detection Rule (PDR) with a highest precedence for said PFCP session; and
looking up an instruction set related to said determined PDR.

* * * * *